(12) United States Patent
Yagawa

(10) Patent No.: US 12,243,998 B2
(45) Date of Patent: Mar. 4, 2025

(54) POWER SUPPLY SYSTEM AND METHOD OF POWER SUPPLY

(71) Applicant: HONDA MOTOR CO., LTD., Tokyo (JP)

(72) Inventor: Shiro Yagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 572 days.

(21) Appl. No.: 17/579,627

(22) Filed: Jan. 20, 2022

(65) Prior Publication Data

US 2022/0238944 A1    Jul. 28, 2022

(30) Foreign Application Priority Data

Jan. 27, 2021   (JP) ................. 2021-011084

(51) Int. Cl.
| | |
|---|---|
| *H01M 16/00* | (2006.01) |
| *H01M 8/04225* | (2016.01) |
| *H01M 8/04858* | (2016.01) |
| *H01M 10/42* | (2006.01) |
| *H01M 10/44* | (2006.01) |
| *H01M 10/46* | (2006.01) |

(52) U.S. Cl.
CPC ..... *H01M 16/006* (2013.01); *H01M 8/04225* (2016.02); *H01M 8/04932* (2013.01); *H01M 10/425* (2013.01); *H01M 10/44* (2013.01); *H01M 10/46* (2013.01); *H01M 2220/20* (2013.01); *H01M 2250/20* (2013.01)

(58) Field of Classification Search
USPC ....................................... 320/101
See application file for complete search history.

(56) References Cited

U.S. PATENT DOCUMENTS

2013/0175972 A1* 7/2013 Akiyama .......... H01M 8/04619
                                                    320/101
2016/0375792 A1* 12/2016 Kazuno .................. B60L 53/20
                                                    320/101

FOREIGN PATENT DOCUMENTS

| JP | 2004-222376 | 8/2004 |
|---|---|---|
| JP | 2005-251674 | 9/2005 |
| JP | 2007-335151 | 12/2007 |
| JP | 2010-004628 | 1/2010 |
| JP | 2011-091899 | 5/2011 |
| JP | 2012-244713 | 12/2012 |
| WO | 2019/035169 | 2/2019 |

OTHER PUBLICATIONS

Japanese Office Action for Japanese Patent Application No. 2021-011084 mailed Sep. 6, 2022.

* cited by examiner

*Primary Examiner* — Bryce M Aisaka
(74) *Attorney, Agent, or Firm* — Amin, Turocy & Watson, LLP

(57) ABSTRACT

A power supply system of the embodiment includes a fuel cell which is able to generate power, a power storage device which stores the power generated by the fuel cell, a converter which converts power from the fuel cell or the power storage device and switches between supply of power from the fuel cell to an auxiliary device and supply of power from the power storage device to the auxiliary device, and a controller which controls at least the switching of the converter.

4 Claims, 3 Drawing Sheets

POWER SUPPLY SYSTEM AND METHOD OF POWER SUPPLY

CROSS-REFERENCE TO RELATED APPLICATION

Priority is claimed on Japanese Patent Application No. 2021-011084, filed Jan. 27, 2021, the content of which is incorporated herein by reference.

BACKGROUND

Field of the Invention

The present invention relates to a power supply system and a method of power supply.

Description of Related Art

Conventionally, a technology for supplying power from a fuel cell system mounted on a vehicle to vehicle auxiliary devices is known (for example, Japanese Unexamined Patent Application, First Publication No. 2004-222376, Japanese Unexamined Patent Application, First Publication No. 2005-251674, and Japanese Unexamined Patent Application, First Publication No. 2007-335151).

SUMMARY

However, there is a likelihood that a voltage that can be generated in a fuel cell may change significantly due to an influence of a sweep current, an influence of a situation of power generation, or the like. Therefore, when power is directly supplied from a fuel cell to an auxiliary device, it is necessary to provide a function of adjustment according to fluctuation of power on the auxiliary device side, and this may cause an increase in costs of the auxiliary device or the like.

One aspect of the present invention has been made in consideration of such circumstances, and one objective thereof is to provide a power supply system capable of supplying appropriate power to an auxiliary device while increase in cost of the auxiliary device is curbed, and a method of power supply.

The power supply system and the method of power supply according to one aspect of the present invention employs the following configuration.

(1): A power supply system according to one aspect of the present invention includes a fuel cell which is able to generate power, a power storage device which stores the power generated by the fuel cell, a converter which converts power from the fuel cell or the power storage device and switches between supply of power from the fuel cell to an auxiliary device and supply of power from the power storage device to the auxiliary device, and a controller which controls at least the switching of the converter.

(2): In the above-described aspect (1), the controller acquires a state of the fuel cell and a state of the power storage device, selects one of the fuel cell and the power storage device to supply power to the auxiliary device on the basis of the acquired states, and controls the converter so that power from the selected one is supplied to the auxiliary device.

(3): In the above-described aspect (1), the converter includes a first terminal connected to the fuel cell, a second terminal connected to the power storage device, and a third terminal connected to the auxiliary device, and switches supply of the power to the auxiliary device by switching between a conductive state and an open state for the first terminal and the third terminal or for the second terminal and the third terminal on the basis of the control of the controller.

(4): In the above-described aspect (3), when the controller determines that the power storage device needs to be charged on the basis of a state of charge of the power storage device, the controller controls the converter so that at least the first terminal and the second terminal are in a conductive state.

(5): In the above-described aspect (4), the controller converts power from the fuel cell to have a voltage value which is equal to or lower than an upper limit value of an allowable voltage of the auxiliary device to which the power is supplied and is higher than a voltage value of the power storage device.

(6): In the above-described aspect (1), the controller controls the converter so that power from the power storage device is used as power for starting the fuel cell.

(7): A method of power supply according to another aspect of the present invention includes a controller of a power supply system which is configured to acquire a state of a fuel cell which is able to generate power and a state of a power storage device which stores the power generated by the fuel cell, select one of the fuel cell and the power storage device to supply power to an auxiliary device on the basis of the acquired states, and control a converter which converts power from the fuel cell or the power storage device and switches between supply of power from the fuel cell to the auxiliary device and supply of power from the power storage device to the auxiliary device so that power from the selected one is supplied to the auxiliary device.

According to any of the above-described aspects (1) to (7), appropriate power can be supplied to the auxiliary device while increase in cost of the auxiliary device connected to the power supply system is curbed.

DESCRIPTION OF EMBODIMENTS

Hereinafter, embodiments of a power supply system and a method of power supply of the present invention will be described with reference to the drawings. In the following, a power supply system mounted on a vehicle will be mainly described. The vehicle is an electric vehicle that uses, for example, power generated by a fuel cell to be described later or power stored in a power storage device as power for traveling or power for operating in-vehicle devices (auxiliary devices). The vehicle is an automobile such as, for example, a two-wheeled vehicle, a three-wheeled vehicle, or a four-wheeled vehicle.

Figure 1:
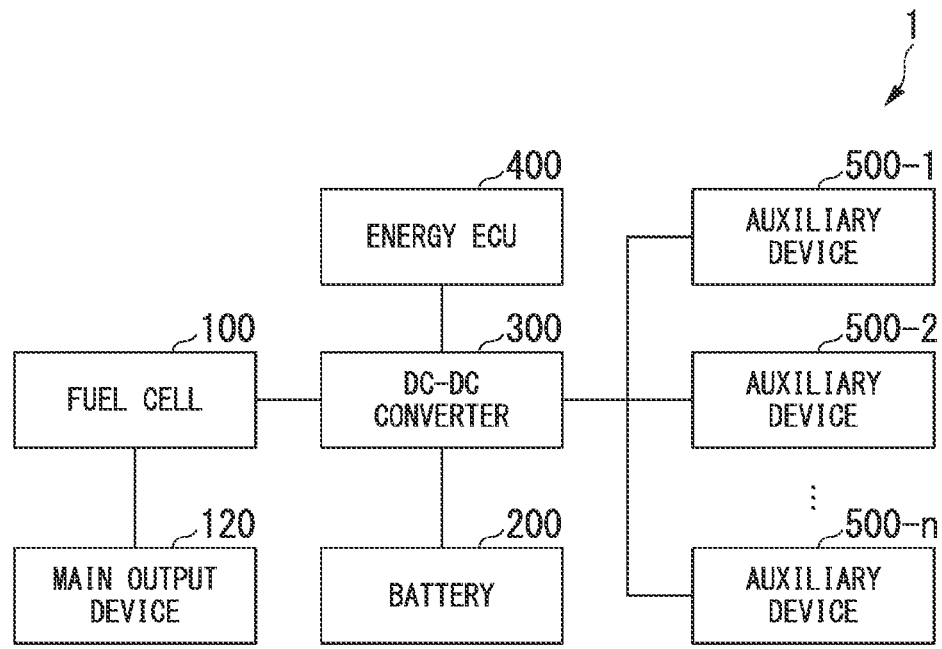
FIG. 1 is a diagram showing an example of a schematic configuration of a power supply system according to an embodiment.

FIG. 1 is a diagram showing an example of a schematic configuration of a power supply system 1 of an embodiment. The power supply system 1 includes, for example, a fuel cell 100, a battery 200, a DC-DC converter 300, and an energy electronic control unit (ECU) 400. The battery 200 is an example of a "power storage device." The energy ECU 400 is an example of a "controller." A main output device 120 and one or more auxiliary devices 500-1, 500-2, ..., 500-n are connected to the power supply system 1. The main output device 120 and the auxiliary devices 500 are examples of a "load." In the following, when the auxiliary devices 500-1, 500-2, ..., and 500-n are referred to without distinguishing them from each other, they are simply collectively referred to as the "auxiliary device 500."

The fuel cell 100 is a battery capable of generating power by reacting, for example, hydrogen contained in a fuel gas with oxygen contained in air. The fuel cell 100 performs power generation under control of, for example, the energy ECU. For example, the fuel cell 100 outputs the generated power to the main output device 120 or outputs the generated power to the DC-DC converter 300 via a DC link or the like. The main output device 120 is a motor that outputs a driving force used for traveling of the vehicle to drive wheels using, for example, power from the fuel cell 100. The main output device 120 may be other devices (for example, a brake device, and the like) for traveling of or stopping the vehicle. The main output device 120 may be connected to the fuel cell 100 via a converter or the like.

The fuel cell 100 may include, for example, a fuel cell sensor that detects presence or absence of power generation, an amount of generated power, a temperature, and the like of the fuel cell 100. A detection result of the fuel cell sensor is output to, for example, the energy ECU 400.

The battery 200 is a secondary battery that can be repeatedly charged and discharged such as, for example, a lithium ion battery, a nickel-hydride battery, or a lead battery. The battery 200 may be, for example, a battery having a lower voltage (for example, 12 [V] or 48 [V]) than that of the power generated by the fuel cell 100. The battery 200 may be a battery unit in which a plurality of battery cells are connected. For example, the battery 200 may store (be charged with) the power generated by the fuel cell 100 and converted by the DC-DC converter 300 or supply (discharge) the power stored in the battery 200 to the auxiliary device 500 or the like.

The battery 200 may include a battery sensor (a current sensor, a voltage sensor, and a temperature sensor) that detects, for example, a current value, a voltage value, a temperature, and the like of the battery 200. A detection result of the battery sensor is output to, for example, the energy ECU 400.

The DC-DC converter 300 converts DC power from the fuel cell 100 or the battery 200 to supply the converted DC power to the auxiliary device 500 or the like. For example, the DC-DC converter 300 boosts or lowers DC power from the fuel cell 100 or the battery 200 to a predetermined power value required by the auxiliary device 500 under control of the energy ECU 400. The DC-DC converter 300 switches between supply of DC power (hereinafter, simply referred to as "power") from the fuel cell 100 to the auxiliary device 500 and supply of power from the battery 200 to the auxiliary device 500 under the control of the energy ECU 400. The DC-DC converter 300 may convert power from the fuel cell 100 and supply it to the battery 200 under the control of the energy ECU 400.

The energy ECU 400 performs control for supplying power to the main output device 120 and the auxiliary device 500. For example, the energy ECU 400 controls at least switching between supply of power from the fuel cell 100 to the auxiliary device 500 and supply of power from the battery 200 to the auxiliary device 500 in the DC-DC converter 300. Details of a function of the energy ECU 400 will be described later.

The auxiliary device 500 is, for example, a device that uses power supplied from the fuel cell 100 or the battery 200 via the DC-DC converter 300 as power for operation. The auxiliary device 500 may be an electric device other than the main output device 120 mounted on the vehicle. The auxiliary device 500 may be, for example, a vehicle sensor, a display device, a light device, a navigation device, a communication device, a drive recorder, a human machine interface (HMI), other in-vehicle devices, or the like.

<Energy ECU>

Figure 2:
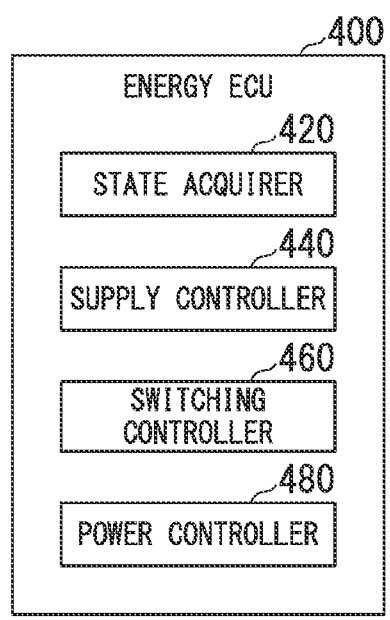
FIG. 2 is a diagram showing an example of a configuration of an energy ECU of the embodiment.

Next, details of a function of the energy ECU 400 will be described. FIG. 2 is a diagram showing an example of a configuration of the energy ECU 400 of the embodiment. The energy ECU 400 includes, for example, a state acquirer 420, a supply controller 440, a switching controller 460, and a power controller 480. The state acquirer 420, the supply controller 440, the switching controller 460, and the power controller 480 are each realized by a hardware processor such as, for example, a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU), or may be realized by software and hardware in cooperation.

The state acquirer 420 acquires a power request, an operation status, and the like for each of one or more auxiliary devices 500-1 to 500-n connected to the DC-DC converter 300. For example, when the state acquirer 420 receives that an ignition switch of the vehicle has entered an ON state or receives an operation of an occupant from the HMI or the like, the state acquirer 420 acquires a power request from an auxiliary device associated with the received contents. The state acquirer 420 acquires an operation status of the auxiliary device 500 by communicating with the auxiliary device 500 during its starting (during its operation) at predetermined time intervals or at predetermined timings, or by receiving an operation signal (for example, a normal signal or an abnormal signal) from the auxiliary device 500. The state acquirer 420 may acquire a state (for example, information detected by a vehicle sensor) or the like of the vehicle on which the power supply system 1 is mounted.

The state acquirer 420 acquires a state of the fuel cell 100 and a state of the battery 200 on the basis of, for example, detection results of sensors (a fuel cell sensor and a battery sensor) provided in the fuel cell 100 and the battery 200. The state of the fuel cell 100 includes information such as, for example, whether or not the fuel cell 100 is generating power, a power generation status when power is being generated (for example, an amount of power generated in a predetermined time), a degree of deterioration, and whether or not an abnormality has occurred. The state of the battery 200 includes information such as, for example, whether or not the battery 200 is being charged or discharged, a state of charge (SOC) of the battery 200, a degree of deterioration, and whether or not an abnormality has occurred.

The supply controller 440 selects one of the fuel cell 100 and the battery 200 to supply power to the auxiliary device 500 on the basis of a power request from the auxiliary device 500, states of the fuel cell 100 and the battery 200, and the like acquired by the state acquirer 420. For example, the supply controller 440 calculates a required amount of power for the power request from the auxiliary device 500. For example, the supply controller 440 calculates a torque to be output by the motor on the basis of an accelerator opening degree of the vehicle and a speed of the vehicle, and calculates the required amount of power by summing a drive shaft load power obtained from the torque and a rotation speed of the motor, and the power required by at least one of the plurality of auxiliary devices. The supply controller 440 may calculate the required amount of power by storing a required amount of power for each auxiliary device during operation in advance and referring to the stored required amount of power. When there are power requests from a plurality of auxiliary devices, the supply controller 440 calculates a total value of required amounts of power from these auxiliary devices. Then, the supply controller 440 compares the calculated required amount of power with the SOC or the like of the battery 200, selects the battery 200 when it is determined that the required amount of power can be supplied by the battery 200, and selects the fuel cell 100 when it is determined that the required amount of power cannot be supplied by the battery 200.

For example, the supply controller 440 may select the battery 200 when the fuel cell 100 is not started or when the fuel cell 100 is caused to be started, and may select the fuel cell 100 when the fuel cell 100 is started (operating). In this case, the supply controller 440 controls the DC-DC converter 300 so that power from the battery 200 is used as power for starting the fuel cell 100.

The supply controller 440 may select the fuel cell 100 or the battery 200 according to types and the number of the auxiliary devices 500 from which power is requested. For example, in a case of an auxiliary device that needs to be started immediately, the supply controller 440 may select the battery 200 that can immediately supply the stored power. The supply controller 440 may select the battery 200 when the number of the auxiliary devices 500 to which power is to be supplied is less than a predetermined number, and select the fuel cell 100 when the number is equal to or more than the predetermined number because the power of the battery 200 would be immediately consumed.

The supply controller 440 may select the battery 200 when an abnormality has occurred in the fuel cell 100 and may select the fuel cell 100 when an abnormality has occurred in the battery 200. The supply controller 440 may select the battery 200 when a degree of deterioration of the fuel cell 100 is equal to or higher than a reference value, and may select the fuel cell 100 when a degree of deterioration of the battery 200 is equal to or higher than a reference value. The supply controller 440 may select the fuel cell 100 or the battery 200 on the basis of an instruction from a user (for example, an occupant of the vehicle on which the power supply system 1 is mounted or a system administrator) or the like.

The switching controller 460 controls a switch (to be described later) included in the DC-DC converter 300 so that power from the fuel cell 100 or the battery 200 selected by the supply controller 440 is supplied to the auxiliary device 500 or the like.

The power controller 480 performs control of power generation of the fuel cell 100, control of charging or discharging the battery 200, or the like on the basis of states of the fuel cell 100 and the battery 200 acquired by the state acquirer 420, a supply status of power to the main output device 120 and the auxiliary device 500, or the like. For example, the power controller 480 determines that the battery 200 needs to be charged when the SOC calculated on the basis of an output of the battery sensor included in the battery 200 is less than a threshold value, and executes control (charging control) for charging the battery 200 using power generation by the fuel cell 100. When the SOC of the battery 200 is equal to or higher than the threshold value, the power controller 480 determines that charging of the battery 200 is not necessary, and executes control to stop the charging control. For example, when there is surplus power generated by the fuel cell 100, the power controller 480 may perform control for charging the battery 200, causing the auxiliary device 500 or the like to consume it, or the like.

<Switching Control in DC-DC Converter>

Figure 3:
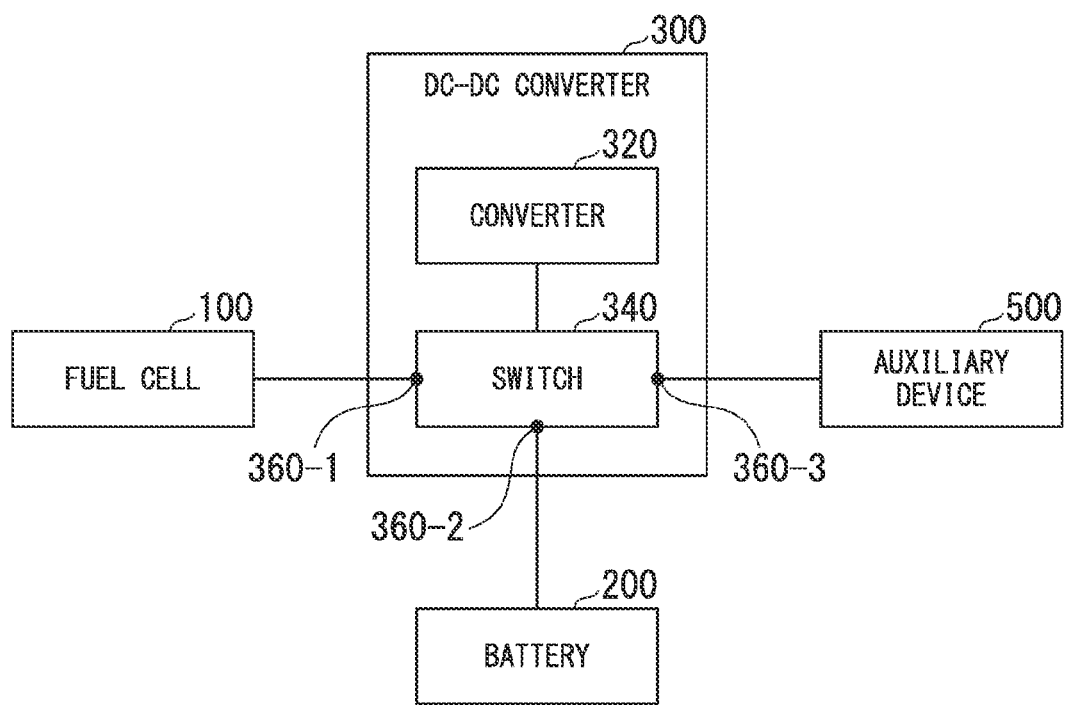
FIG. 3 is a diagram showing an example of a configuration of a DC-DC converter according to the embodiment.

Next, contents of the switching control in the DC-DC converter 300 will be specifically described. FIG. 3 is a diagram showing an example of a configuration of the DC-DC converter 300 of the embodiment. The DC-DC converter 300 includes, for example, a converter 320 and a switch 340.

The converter 320 lowers or boosts power supplied from the fuel cell 100 or the battery 200 according to a required amount of power of the auxiliary device 500 of a supply destination that has requested power.

The switch 340 switches between supply of power from the fuel cell 100 to the auxiliary device 500 and supply of power from the battery 200 to the auxiliary device 500 under the control of the switching controller 460. The switch 340 is, for example, a switch swing circuit or a switching element such as an electromagnetic switch. For example, as shown in FIG. 3, the switch 340 includes at least a first terminal 360-1 connected to the fuel cell 100, a second terminal 360-2 connected to the battery 200, and a third terminal 360-3 connected to the auxiliary device 500. The first terminal 360-1 connected to the fuel cell 100 includes not only a case in which the fuel cell 100 and the first terminal 360-1 are directly connected, but also a case in which they are connected via an electric line (electrically conductive line) or the like. The same applies to the second terminal 360-2 connected to the battery 200 and the third terminal 360-3 connected to the auxiliary device 500. When there are a plurality of auxiliary devices 500-1 to 500-$n$ in the power supply system 1, the third terminal 360-3 may be provided for each auxiliary devices to be connected.

The switch 340 switches between a conductive state or an open state for the terminals of the first terminal 360-1, the second terminal 360-2, and the third terminal 360-3, for example, on the basis of the control of the switching controller 460. For example, when the supply controller 440 selects to supply power from the fuel cell 100 to the auxiliary device 500, the switching controller 460 outputs a control signal for making the first terminal 360-1 and the third terminal 360-3 conductive and making the second terminal 360-2 and the third terminal 360-3 open to the switch 340. When the supply controller 440 selects to supply power from the battery 200 to the auxiliary device 500, the switching controller 460 outputs a control signal for making the second terminal 360-2 and the third terminal 360-3 conductive and making the first terminal 360-1 and the third terminal 360-3 open to the switch 340.

When a control of charging the battery 200 is performed by a control of the power controller 480, the switching controller 460 outputs a control signal for making at least the first terminal 360-1 and the second terminal 360-2 conductive to the switch 340. When the battery 200 is charged, the first terminal 360-1 and the third terminal 360-3 may be in an open state or may be in a conductive state. In this case, when the power controller 480 causes the converter 320 to convert power from the fuel cell 100, the power is converted into a voltage value that is equal to or lower than an upper limit value of an allowable voltage of the auxiliary device 500 to which the power is supplied and is higher than a voltage value of the battery 200. Thereby, since the voltage value of the battery 200 is lower than the converted voltage value, the power can be caused to flow to the battery 200 side to charge the battery 200 even in a conductive state. When power from the fuel cell 100 is supplied to the battery 200, the power controller 480 may cause the converter 320 to perform power conversion to approach an upper limit value of the allowable voltage of the auxiliary device 500 within a range not exceeding the upper limit value thereof.

When supply of power from the fuel cell 100 to the battery 200 or the auxiliary device 500 is not performed, the switching controller 460 may output a control signal for making the first terminal 360-1 and the second terminal 360-2 open and making the first terminal 360-1 and the third terminal 360-3 open to the switch 340.

The switch 340 performs switching control of states between the terminals on the basis of a control signal of the switching controller 460. Thereby, power from the fuel cell 100 and power from the battery 200 can be adjusted to a predetermined voltage by the DC-DC converter 300 and can be supplied to all the auxiliary devices 500-1 to 500-n. Therefore, a function for adjusting power fluctuation is not necessary to be provided in the auxiliary device 500, and thereby costs of the auxiliary device 500 can be reduced.

[Processing Flow]

Figure 4:
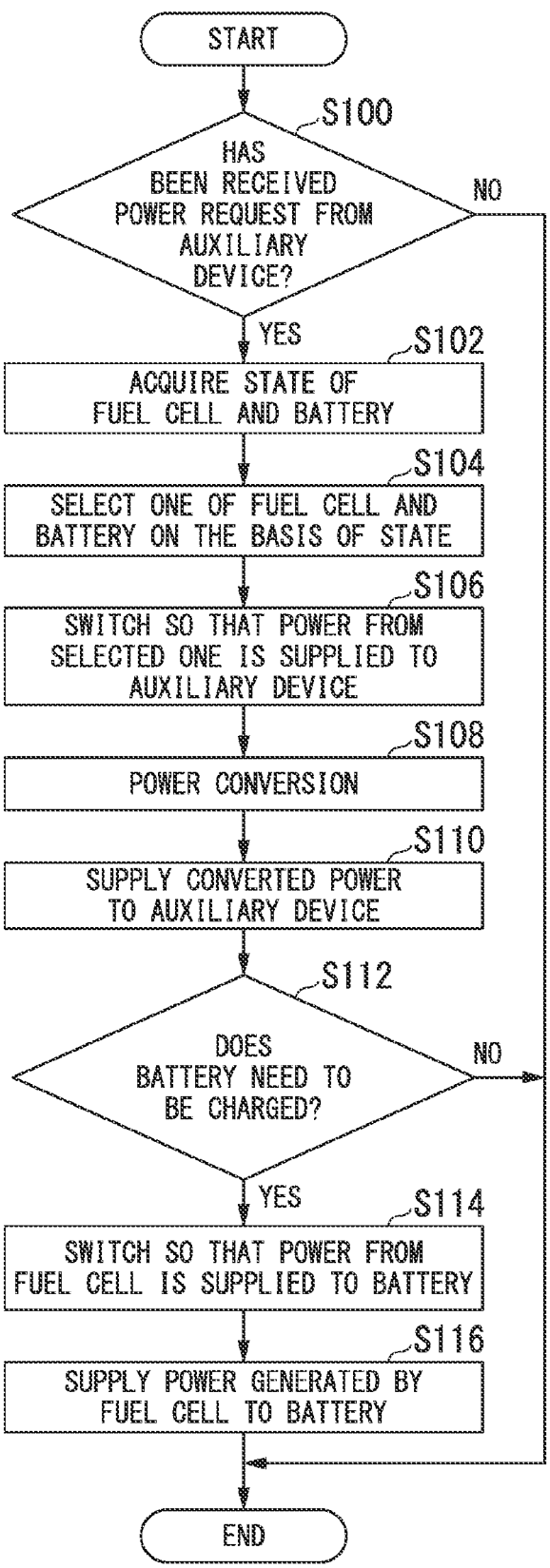
FIG. 4 is a flowchart showing an example of a processing flow executed by the power supply system of the embodiment.

FIG. 4 is a flowchart showing an example of a processing flow executed by the power supply system 1 of the embodiment. In the example of FIG. 4, the state acquirer 420 determines whether or not a power request from the auxiliary device 500 has been received (step S100). When it is determined that the power request from the auxiliary device 500 has been received, the state acquirer 420 acquires states of the fuel cell and the battery 200 (step S102). Next, the supply controller 440 selects one of the fuel cell 100 and the battery 200 to supply power to the auxiliary device 500 on the basis of the states acquired by the state acquirer 420 (step S104). Next, the switching controller 460 controls the DC-DC converter 300 so that power from the selected one is supplied to the auxiliary device 500, and switches between a conductive state or an open state for the terminals (the first terminal 360-1, the second terminal 360-2, and the third terminal 360-3) (step S106). The power controller 480 causes the DC-DC converter 300 to convert power on the basis of the power request from the auxiliary device 500 (step S108), and supplies the converted power to the auxiliary device (step S110).

Next, the supply controller 440 determines whether or not the battery 200 needs to be charged on the basis of a state of charge (for example, SOC) of the battery 200 (step S112). When it is determined that the battery needs to be charged, the switching controller 460 controls the DC-DC converter 300 so that power from the fuel cell 100 is supplied to the battery 200 (step S114). In the processing of step S114, the DC-DC converter 300 switches so that the first terminal 360-1 and the second terminal 360-2 are in a conductive state on the basis of, for example, the control from the switching controller 460. The power controller 480 causes the fuel cell 100 to generate power and supplies it to the battery 200 via the DC-DC converter 300 (step S116). The battery 200 is charged by the processing of step S116. Thereby, processing of the present flowchart ends. When it is determined in the processing of step S100 that the power request from the auxiliary device 500 has not been received, or when it is determined in the processing of step S112 that the battery does not need to be charged, the present flowchart ends.

When it is no longer necessary to supply power to the auxiliary device 500 after the processing of step S110 shown in FIG. 4 is executed, the switching controller 460 may perform processing of switching between a conductive state or an open state for the terminals (the first terminal 360-1, the second terminal 360-2, and the third terminal 360-3) of the DC-DC converter 300 so that power from the fuel cell 100 or the battery 200 is not supplied to the auxiliary device 500. When it is no longer necessary to supply power to the battery 200 after the processing of step S116 is executed (for example, when the SOC is equal to or higher than a threshold value), the switching controller 460 may perform a control for switching the first terminal 360-1 and the second terminal 360-2 of the DC-DC converter 300 to an open state so that power from the fuel cell 100 is not supplied to the battery 200.

In the processing shown in FIG. 4, the processing of steps S100 to S110 (hereinafter referred to as first processing) and the processing of steps S112 to S116 (hereinafter referred to as second processing) may be executed separately. In this case, the energy ECU 400 may control so that, when one of the first processing and the second processing is being executed, the other processing is not executed (waits until one processing is completed), or may execute the first processing and the second processing in parallel while dividing them in a time-division manner or the like. The energy ECU 400 may execute the first processing in preference to the second processing, or may execute the second processing when the first processing is not executed.

According to the embodiment described above, the power supply system 1 includes the fuel cell 100 capable of generating power, the battery (an example of a power storage device) 200 that stores the power generated by the fuel cell 100, the DC-DC converter (an example of a converter) 300 that converts power from the fuel cell 100 or the battery 200 and switches between supply of power from the fuel cell 100 to the auxiliary device 500 and supply of power from the battery 200 to the auxiliary device 500, and the energy ECU (an example of a controller) 400 that controls at least the switching in the DC-DC converter 300, and thereby appropriate power can be supplied to the auxiliary device while increase in cost of the auxiliary device connected to the power supply system is curbed.

Specifically, in the power supply system 1 of the embodiment, for example, the DC-DC converter 300 is provided between the fuel cell 100 and the auxiliary device 500, and the battery 200 having a voltage (for example, 12 [V] or 48 [V]) lower than that of the fuel cell 100 is connected to the DC-DC converter 300. Then, the DC-DC converter 300 boosts or lowers power from the fuel cell 100 and power from the battery 200 to supply a stable voltage (for example, a constant voltage) to the auxiliary device 500. Therefore, even when it is assumed that power generated by the fuel cell 100 fluctuates or is connected to the fuel cell 100 or the battery 200 having different voltage values, a function of adjusting voltage fluctuation or the like on the auxiliary device side becomes unnecessary, and as a result, costs of the auxiliary device 500 can be suppressed, and versatility in use of the auxiliary device 500 can be improved.

According to the embodiment, the DC-DC converter 300 includes the first terminal 360-1 connected to the fuel cell 100, the second terminal 360-2 connected to the battery 200, and the third terminal 360-3 connected to the auxiliary device 500 and switches between a conductive state or an open state for the terminals according to a supply source and a supply destination of power, and thereby not only power of the fuel cell 100 or the battery 200 can be supplied to the auxiliary device 500 but also power of the fuel cell 100 can be supplied to the battery 200 to charge the battery 200.

In the fuel cell 100 of the embodiment, a battery that generates power by reacting hydrogen and oxygen has been used as an example, but other fuel cells of various types may also be applied. A part or all of the functions included in the energy ECU 400 of the embodiment may be provided in the DC-DC converter 300. The power supply system 1 of the above-described embodiment may be mounted on an electric device (for example, a ship, a flight vehicle, or a robot) other than a vehicle in addition to (or instead of) a vehicle, and may be mounted on a fuel cell system of a stationary type.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A power supply system comprising:
    a fuel cell which is able to generate power;
    a power storage device which stores the power generated by the fuel cell;
    a converter which converts power from the fuel cell or the power storage device and switches between supply of power from the fuel cell to an auxiliary device and supply of power from the power storage device to the auxiliary device; and
    a controller which controls at least the switching of the converter,
    wherein the converter includes a first terminal connected to the fuel cell, a second terminal connected to the power storage device, and a third terminal connected to the auxiliary device, and switches supply of the power to the auxiliary device by switching between a conductive state and an open state for the first terminal and the third terminal or for the second terminal and the third terminal on the basis of the control of the controller,
    wherein when the controller determines that the power storage device needs to be charged on the basis of a state of charge of the power storage device, the controller controls the converter so that at least the first terminal and the second terminal are in a conductive state, and
    wherein the controller converts power from the fuel cell to have a voltage value which is equal to or lower than an upper limit value of an allowable voltage of the auxiliary device to which the power is supplied and is higher than a voltage value of the power storage device, and supplies power from the fuel cell to the auxiliary device while also supplying power to the power storage device.

2. The power supply system according to claim 1, wherein the controller acquires a state of the fuel cell and a state of the power storage device, selects one of the fuel cell and the power storage device to supply power to the auxiliary device on the basis of the acquired states, and controls the converter so that power from the selected one is supplied to the auxiliary device.

3. The power supply system according to claim 1, wherein the controller controls the converter so that power from the power storage device is used as power for starting the fuel cell.

4. A method of power supply comprising a controller of a power supply system which is configured to:
    acquire a state of a fuel cell which is able to generate power and a state of a power storage device which stores the power generated by the fuel cell;
    select one of the fuel cell and the power storage device to supply power to an auxiliary device on the basis of the acquired states;
    control a converter which converts power from the fuel cell or the power storage device and switches between supply of power from the fuel cell to the auxiliary device and supply of power from the power storage device to the auxiliary device so that power from the selected one is supplied to the auxiliary device;
    include a first terminal connected to the fuel cell, a second terminal connected to the power storage device, and a third terminal connected to the auxiliary device, and switch supply of the power to the auxiliary device by switching between a conductive state and an open state for the first terminal and the third terminal or for the second terminal and the third terminal on the basis of the control of the controller;
    determine that the power storage device needs to be charged on the basis of a state of charge of the power storage device, control the converter so that at least the first terminal and the second terminal are in a conductive state; and
    convert power from the fuel cell to have a voltage value which is equal to or lower than an upper limit value of an allowable voltage of the auxiliary device to which the power is supplied and is higher than a voltage value of the power storage device, and supply power from the fuel cell to the auxiliary device while also supplying power to the power storage device.

* * * * *